United States Patent
Müller et al.

(10) Patent No.: US 11,525,224 B2
(45) Date of Patent: Dec. 13, 2022

(54) MONITORING DEVICE FOR A SLIPFORM PAVER FOR MONITORING THE COMPACTION OF CONCRETE AND A METHOD FOR MONITORING THE COMPACTION OF CONCRETE DURING OPERATION OF A SLIPFORM PAVER

(71) Applicant: Wirtgen GmbH, Windhagen (DE)

(72) Inventors: Adrian Müller, Niedersteinebach (DE); Martin Dahm, Gieleroth (DE)

(73) Assignee: Wirtgen GmbH

( * ) Notice: Subject to any disclaimer, the term of this patent is extended or adjusted under 35 U.S.C. 154(b) by 329 days.

(21) Appl. No.: 17/030,101

(22) Filed: Sep. 23, 2020

(65) Prior Publication Data

US 2021/0087758 A1  Mar. 25, 2021

(30) Foreign Application Priority Data

Sep. 24, 2019 (DE) .................... 10 2019 125 590.2

(51) Int. Cl.
*E01C 19/48* (2006.01)
*H02K 11/27* (2016.01)
(Continued)

(52) U.S. Cl.
CPC .......... *E01C 19/4893* (2013.01); *E01C 23/01* (2013.01); *H02K 7/061* (2013.01);
(Continued)

(58) Field of Classification Search
CPC ..... E01C 19/48; E01C 19/4893; H02K 7/061; H02K 11/27; H02P 23/08; H02P 2205/01; H02P 2207/01
(Continued)

(56) References Cited

U.S. PATENT DOCUMENTS 4,044,285 A * 8/1977 Plunkett .................. H02P 21/10
  318/803
5,013,990 A * 5/1991 Weber ...................... H02P 23/26
  318/822
(Continued)

FOREIGN PATENT DOCUMENTS

DE 19913077 A1 10/2000
DE 10354002 A1 6/2005
(Continued)

OTHER PUBLICATIONS

EP Search Report for corresponding EP 20 19 8005, dated Feb. 17, 2021, 8 pages (not prior art).

*Primary Examiner* — Raymond W Addie
(74) *Attorney, Agent, or Firm* — Gary L. Montle; Lucian Wayne Beavers; Patterson Intellectual Property Law, PC

(57) ABSTRACT

A device is provided for monitoring the compaction of concrete introduced into a slipform of a slipform paver by means of at least one concrete compacting device that has an asynchronous motor for driving an unbalanced mass which generates vibrations. The monitoring device comprises an apparatus for monitoring the stator current of the asynchronous motor, the apparatus being configured such that a change in the compaction of the concrete is determined based on an analysis of the stator current. The apparatus for monitoring the stator current of the asynchronous motor is preferably configured such that the amplitude spectrum of the stator current is determined in order to analyse the stator current. It is advantageous that the compaction of the concrete is not monitored using sensors which are exposed to harsh ambient conditions during operation of the slipform paver.

20 Claims, 2 Drawing Sheets

(51) Int. Cl.
  *E01C 23/01* (2006.01)
  *H02K 7/06* (2006.01)
  *H02P 23/08* (2006.01)

(52) U.S. Cl.
  CPC .............. *H02K 11/27* (2016.01); *H02P 23/08* (2013.01); *H02P 2205/01* (2013.01); *H02P 2207/01* (2013.01)

(58) Field of Classification Search
  USPC .................. 404/72, 75, 84.05–84.5, 114, 118
  See application file for complete search history.

(56) References Cited

U.S. PATENT DOCUMENTS

| | | | |
|---|---|---|---|
| 6,481,924 B1 | 11/2002 | Smolders et al. | |
| 6,529,135 B1 * | 3/2003 | Bowers | H02P 23/0077 340/648 |
| 2008/0012165 A1 | 1/2008 | Kunze et al. | |
| 2012/0235621 A1 * | 9/2012 | Yamada | H02K 19/26 318/716 |
| 2019/0068097 A1 * | 2/2019 | Li | H02P 21/05 |
| 2022/0052633 A1 * | 2/2022 | Reddy | H02P 23/0022 |

FOREIGN PATENT DOCUMENTS

| | | | | |
|---|---|---|---|---|
| DE | 102008059528 A1 | 6/2010 | | |
| DE | 102012002166 A1 | 8/2013 | | |
| DE | WO 2022038026 | * 2/2022 | ............. | H02P 23/14 |
| EP | 1103659 B1 | 4/2008 | | |
| EP | 2942867 A2 | 11/2015 | | |
| WO | 2005049941 A1 | 6/2005 | | |
| WO | 2019136088 | † 7/2019 | | |

\* cited by examiner
† cited by third party

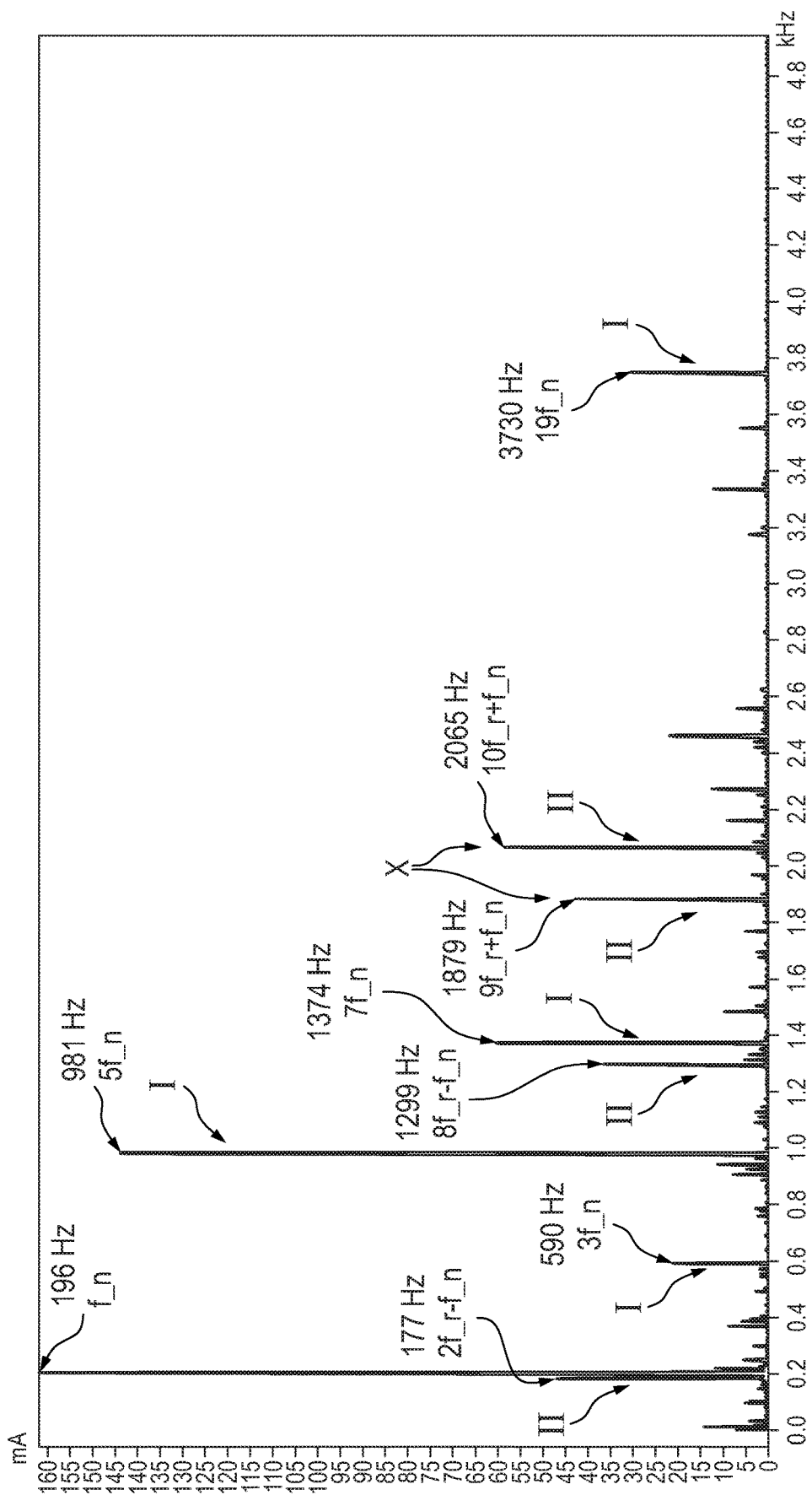

MONITORING DEVICE FOR A SLIPFORM PAVER FOR MONITORING THE COMPACTION OF CONCRETE AND A METHOD FOR MONITORING THE COMPACTION OF CONCRETE DURING OPERATION OF A SLIPFORM PAVER

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of German Patent Application No. DE 10 2019 125 590.2, filed on Sep. 24, 2019, and which is hereby incorporated by reference in its entirety.

BACKGROUND

The invention relates to a monitoring device for a slipform paver for monitoring the compaction of concrete introduced into a slipform of a slipform paver by means of at least one concrete compacting device that has an asynchronous motor for driving an unbalanced mass that generates vibrations. The invention also relates to a method for monitoring, during operation of the slipform paver, the compaction of concrete introduced into a slipform of a slipform paver by means of at least one concrete compacting device that has an asynchronous motor for driving an unbalanced mass that generates vibrations.

The slipform pavers have a slipform, which is also referred to as a concrete trough. A slipform paver is described in EP 1 103 659 B1, for example. Structures of different designs, for example protective walls, curbs or entire roadways, can be produced from concrete by means of the slipform. The concrete is continuously introduced into the slipform, which moves at a constant speed over the subsurface. In the slipform, there must always be a specific amount of concrete, so that sufficient pressure is exerted on the concrete by its own weight. The concrete must be compacted inside and/or in front of the slipform. Concrete compacting devices that are provided on or in the slipform are used to compact the concrete. These concrete compacting devices are also known as external or internal vibrators. The slipform pavers often have a plurality of bottle-shaped or rod-shaped internal vibrators that are hung in and/or in front of the slipform and are immersed in the concrete during operation.

Electric concrete vibrators are known which have an asynchronous motor that drives an eccentric flywheel mass (unbalanced mass) that is caused to vibrate. The compaction output of the vibrator depends on the frequency of the vibrations, which in turn is determined by the speed of the asynchronous motor.

During operation of a slipform paver, the problem arises that technical defects in the concrete vibrators can lead to the concrete in the slipform not being sufficiently compacted. In particular during operation of internal vibrators that are completely immersed in the concrete, technical defects in the individual vibrators are not easily detected by the operating personnel of the slipform paver. Since subsequent compaction is not possible, components can be manufactured in which the concrete does not meet the requirements in some places. Due to their insufficient strength, these concrete components have to be demolished and re-manufactured, which involves enormous costs.

DE 103 54 002 A1 describes an electrically driven internal vibrator that has a speed control means. In order to detect the operating state of the vibrator, a device is proposed which detects the sound pressure or the vibrations. In order to detect the sound pressure or the vibrations, microphones or acceleration sensors are proposed which are provided on the concrete vibrator. It is disadvantageous that the microphones and acceleration sensors are exposed to harsh ambient conditions. Not only are such sensors, which are attached to the outside of the concrete vibrators, exposed to the vibrations, but also to the concrete, which has a strong abrasive effect due to the aggregate thereof. For this reason, the sensors, like the outer shell of the vibrator, must be made of a suitably hard material. Due to the limited installation space, it is very difficult to arrange a sensor inside the vibrator.

BRIEF SUMMARY

One problem which may be addressed by the present disclosure is that of providing a monitoring device for a slipform paver which allows reliable monitoring of the compaction of the concrete introduced into the slipform during operation of the slipform paver under harsh ambient conditions. Another problem addressed by the present disclosure is that of providing a method that allows reliable monitoring of the compaction of the concrete introduced into the slipform. The present disclosure also addresses the problem of allowing the use of conventional concrete vibrators that are not or would not have to be equipped with sensors for monitoring the operating state.

Tests have shown that, during operation of a concrete compacting device in which the eccentric flywheel mass (unbalanced mass) is driven by an asynchronous motor, the rotor shaft can plastically deform during operation of the asynchronous motor, due to the unbalanced mass. When the rotor shaft deflects, the width of the air gap between the stator and rotor changes, which can be detected in the amplitude spectrum of the stator current. It has been shown that the amplitude spectrum always has specific characteristic features under all ambient conditions when the concrete compacting device is operating properly at the predefined rotor frequency (speed), i.e. the actual speed of the concrete vibrator does not deviate from the desired speed.

A monitoring device and method as disclosed herein are characterised in that a change in the compaction of the concrete introduced into the slipform of the slipform paver is determined based on an analysis of the stator current of the asynchronous motor. A monitoring device as disclosed herein has an apparatus for monitoring the stator current of the asynchronous motor, the apparatus being configured such that a change in the compaction of the concrete is determined based on an analysis of the stator current. The stator current can be picked up via a current transformer that allows potential-free measurement of the stator current. However, the stator current can also be measured directly. The apparatus for monitoring the stator current of the asynchronous motor is preferably configured such that the amplitude spectrum of the stator current is determined in order to analyse the stator current.

A monitoring device and method as disclosed herein have the decisive advantage that the compaction of the concrete is not monitored using components, in particular sensitive sensors, in the vicinity of the concrete vibrator, which components are exposed to harsh ambient conditions during operation of the slipform paver. There is therefore no risk that such components could fail, which would make the monitoring unreliable.

The apparatus for monitoring the stator current of the asynchronous motor is preferably a digital signal processing apparatus that is configured such that the stator current is sampled, the amplitude spectrum of the stator current being determined by a discrete-time Fourier transformation (DFT), in particular a discrete-time fast Fourier transformation (FFT), of the stator current. The signal processing methods required for this are part of the prior art.

In one embodiment, the apparatus for monitoring the stator current is configured such that the distribution of individual harmonics, which are attributable to the unbalanced mass, over the frequency of the spectral components is continuously determined and compared with a distribution of individual harmonics over the frequency of the spectral components, which distribution is characteristic of a predefined speed of the asynchronous motor. Tests have shown that the harmonics that are attributable to the unbalanced mass differ significantly from the harmonics that are attributable to the known network frequency, so that an appropriate selection can be made from the harmonics occurring in the amplitude spectrum. If the distribution deviates from the individual harmonics, a control signal is generated which signals a change in the compaction of the concrete introduced into the slipform of the slipform paver. In this case, it is determined that the compaction of the concrete is improper.

In this context, a continuous determination of the distribution of individual harmonics is understood to mean a determination of the harmonics at at least two successive points in time in order to be able to monitor the concrete compacting device over at least part of the operating time or to be able to make a comparison between a previous point in time and a subsequent point in time, so that a change in state can be recognised. In principle, however, only a single measurement is possible.

The distribution of individual harmonics which is characteristic of a predefined rotor frequency (speed) of the asynchronous motor can be determined empirically and stored in a memory of the monitoring device. For example, the permissible deviations can be defined by suitable threshold values or specific frequency ranges in which the individual selected harmonics should lie.

In another embodiment, the determination of the speed of the asynchronous motor is based on an analysis of the stator current. The apparatus for monitoring the stator current is configured such that the distribution of individual harmonics, which are attributable to the unbalanced mass, over the frequency of the spectral components is continuously determined, and the speed of the asynchronous motor is continuously determined based on the distribution of individual harmonics over the frequency of the spectral components and over the network frequency of the stator current, a control signal being generated when a certain deviation in the speed occurs, which control signal signals a change in the compaction of the concrete introduced into the slipform of the slipform paver. If a drop in speed is detected, it can be determined that the concrete is insufficiently compacted.

In a further embodiment, the apparatus for monitoring the stator current of the asynchronous motor is configured such that the continuously determined speed of the asynchronous motor is compared with a predefined limit value, the control signal being generated when the limit value is not reached. However, a control signal can also be generated when the limit value is exceeded.

The apparatus for monitoring the stator current of the asynchronous motor can be configured such that a threshold value for the amplitudes of the harmonics is predefined for the analysis of the stator current of the asynchronous motor, the distribution of individual harmonics over the frequency of the spectral components that are above the threshold value being determined continuously. This masks out small amplitudes that are in the range of noise and cannot provide reliable information.

In one embodiment, the monitoring device has a signal unit for receiving the control signal, the signal unit being designed such that improper compaction of the concrete during operation of the slipform paver is indicated by means of an acoustic and/or optical and/or a tactile signal when the signal unit receives the control signal. The monitoring device can also be designed such that proper compaction of the concrete during operation of the slipform paver is indicated by means of an acoustic and/or optical and/or a tactile signal when the signal unit does not receive the control signal. If there are a plurality of concrete compacting devices on the slipform paver, the monitoring device can preferably monitor said concrete compacting devices individually. If the monitoring device indicates improper compaction by means of a signal, then there is preferably also an indication of the compaction device at which improper compaction is taking place.

The control signal can also be supplied to the central control unit of the slipform paver, in order to intervene in the machine control system. The intervention in the machine control system can be that the slipform paver is stopped.

A monitoring device as disclosed herein can form a separate assembly with which a conventional slipform paver can be retrofitted. However, the monitoring device can also be part of the slipform paver, it being possible for the apparatus for monitoring the stator current to be part of the central control unit of the slipform paver.

BRIEF DESCRIPTION OF THE SEVERAL VIEWS OF THE DRAWINGS

An exemplary embodiment of the invention is explained in more detail below with reference to the drawings, in which:

FIG. 2 is a block diagram of the monitoring device and FIG. 3 shows the amplitude spectrum of the stator current of the asynchronous motor of a concrete compacting device.

DETAILED DESCRIPTION

Figure 1:
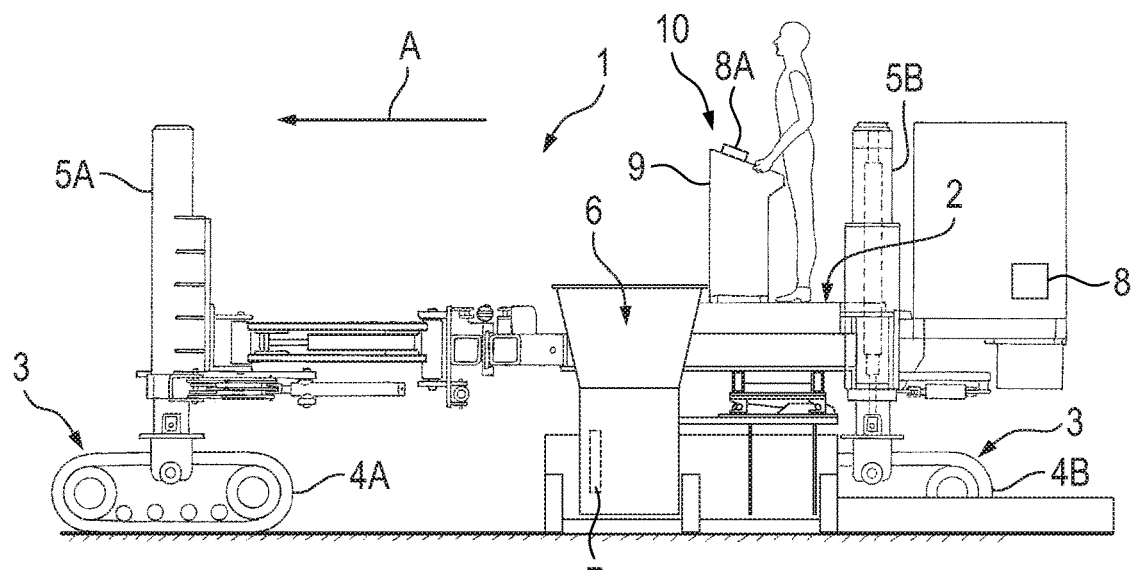
FIG. 1 is a lateral view of a slipform paver having a monitoring device for monitoring the compaction of concrete.

FIG. 1 shows a lateral view of an embodiment of a slipform paver without a conveying means, as described in detail in EP 1 103 659 B1. Since slipform pavers as such belong to the prior art, additional description of certain components of the construction machine may be correspondingly limited herein.

The slipform paver 1 has a machine frame 2 that is supported by a chassis 3. The chassis 3 has two front and two rear steerable running gears 4A, 4B that are fastened to front and rear lifting columns 5A, 5B. The working direction (travel direction) of the slipform paver is marked with an arrow A.

The running gears 4A, 4B and the lifting columns 5A, 5B are part of a drive means of the slipform paver for performing translational and/or rotational movements on the terrain. The drive means also includes preferably hydraulic drives (not shown) for the running gears 4A, 4B and an internal combustion engine (not shown). The construction machine can be moved forwards and backwards using the running gears 4A, 4B. The machine frame 2 can be moved vertically and tilted relative to the ground by raising and lowering the lifting columns 5A, 5B.

The slipform paver has a slipform 6 for shaping concrete, which can be raised or lowered together with machine frame 2. In order to compact the concrete, a plurality of concrete compacting devices is provided in the slipform, the compacting devices being immersed in the concrete during operation of the slipform paver. In FIG. 1, one of the concrete compacting devices 7 is shown by dashed lines. The concrete compacting devices are conventional internal vibrators arranged in a row. The internal vibrators have a bottle-shaped or rod-shaped housing in which an asynchronous motor is arranged, on the motor shaft of which an unbalanced mass is attached. When the motor shaft rotates, vibrations are generated by the unbalanced mass which are transmitted to the concrete so that the concrete is compacted. In the present embodiment, the asynchronous motor is operated with an alternating voltage of 110 V and a network frequency of 200 Hz (on-board network).

In addition, the slipform paver has a monitoring device 8, shown only schematically in FIG. 1, for monitoring the compaction of the concrete. The monitoring device 8 has a signal unit 8A that is provided on a control panel 9 that is located at a driver's platform 10 in the field of vision of the operating personnel.

Figure 2:
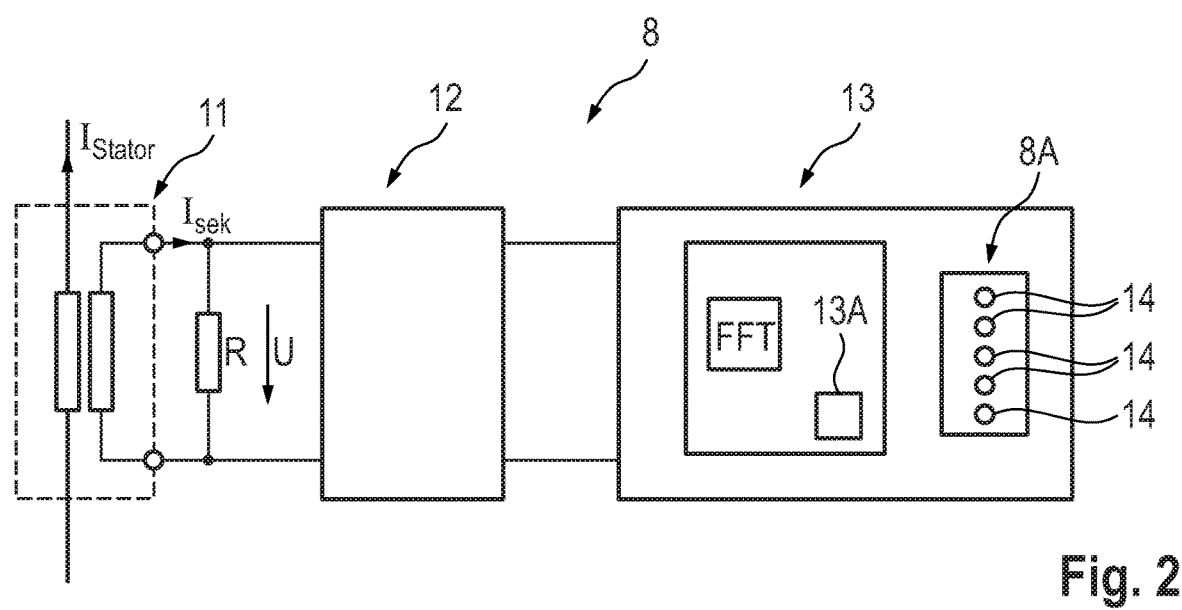

The structure and the mode of operation of the monitoring device are described in detail below with reference to FIGS. 2 and 3. The monitoring device has a current transformer 11 for measuring the stator current $I_{stator}$, which transformer is integrated or can be easily integrated into the existing circuit of the asynchronous motor of a concrete compacting device 7 of the slipform paver 1 and allows a potential-free measurement of the current. The known slipform pavers can therefore easily be retrofitted with the monitoring device. The current transformer transforms the stator current $I_{stator}$ (primary current) into a secondary current $I_{sec}$. The measurement signal is picked up as a voltage U via a resistor R.

The monitoring device 8 also has an analogue-to-digital converter (ADC) 12 that receives the analogue measurement signal. The analogue-to-digital converter 12 converts the analogue measurement signal into a digital signal.

In addition, the monitoring device 8 has an apparatus 13 for monitoring the stator current, which apparatus receives the digital measurement signal. The apparatus 13 for monitoring the stator current is configured such that the method steps described below are carried out. For example, said apparatus can have a microcontroller that has a CPU and a working memory. A data processing program (software), by means of which the required arithmetic operations are carried out, can run on the monitoring device.

The digital measurement signal is first transformed from the time domain into the frequency domain in order to be able to analyse the frequency spectrum. The amplitude spectrum is of particular interest for monitoring the stator current $I_{stator}$.

The transformation from the time domain into the frequency domain takes place using a discrete-time, fast Fourier transformation (FFT/DFT). The algorithms required for this transformation are known to a person skilled in the art. Appropriate software can be implemented for this purpose.

The rotor frequency (speed) $f_r$ of the asynchronous motor is obtained from the following equations:

$$f_H = f_n \cdot \left[(R \pm n_d)\frac{1-s}{p} \pm v\right]$$ Equation (1)

$f_n$ network frequency
$f_H$ frequency of a harmonic attributable to the unbalanced mass (eccentricity)
R number of rotor bars of the asynchronous motor
s relative slip
p pool pair number
$n_d$ order of eccentricity
v order of harmonics of the network current Since the number of rotor bars R of the asynchronous motor and the pool pair number p are known, equation (1) can be simplified. It is assumed that R=9 and p=1. Then the following equation results:

$$f_{H1} = f_n \cdot \left[(9 \pm n_d)\frac{1-s}{p} \pm v\right]$$ Equation (2)

Since the order of eccentricity $n_d$ is unknown, the amplitude spectrum of the stator current is analysed for various integer values of $n_d$. For this reason, (9+/−$n_d$) is combined to form m.

$$f_{H1} = f_n \cdot [m \cdot (1-s) \pm v] = mf_r \pm vf_n, m \in Z$$ Equation (3)

fr rotor frequency (speed) of the asynchronous motor.

FIG. 3 shows an amplitude spectrum of the stator current $I_{stator}$, which was determined using the apparatus 13 for monitoring the stator current during stationary operation of an internal vibrator. The internal vibrator was powered by a frequency converter instead of a frequency inverter in order to obtain a spectrum that is as realistic as possible. The network frequency is 196 Hz and is denoted by f_n, and the rotor frequency is denoted as f_r. The rotor frequency fr is 186.9 Hz in the present embodiment. The following describes how the rotor frequency fr is determined from the amplitude spectrum.

In FIG. 3, the network harmonics that occur are denoted by I, and the harmonics that can be calculated using equation (3) are denoted by II. The only harmonics that are marked are those that are significantly above the noise. In the amplitude spectrum, harmonics that have the following orders can be clearly identified:

v=1,m=9 v=1,m=10 v=−1,m=2 v=−1,m=8

These values could also be observed at other loads. It has been shown that the amplitude of the harmonics increases when the concrete vibrator is not powered by a generator but is operated using a frequency converter. This allows further harmonics to be identified in the noise. In addition, measurements have shown that the stator currents do not mutually influence one another when a plurality of concrete vibrators are operated at the same time, so the speed of each vibrator can be determined individually by analysing the stator current. It has also been shown that the difference can be easily recognised between harmonics that arise due to an unbalanced mass (air gap eccentricity) and harmonics of the network. Harmonics of the network are at the same frequency for every concrete vibrator. The harmonics that arise due to an eccentricity of the air gap also occur at different points in vibrators that have different speeds. The high orders of m result in large frequency differences in the amplitude spectrum, even in the case of small differences in speed.

The minimum sampling frequency is determined by the Nyquist-Shannon sampling theorem $$f_{sample} \geq 2 f_{max} \quad \text{(Equation 4)}.$$

In the present embodiment, the sampling frequency is 5 kHz. Since the measurement signal is sampled using the analogue-to-digital converter 12, non-compliance with the Nyquist-Shannon sampling theorem can result in aliasing effects that can be prevented using filters. In order to reduce the aliasing effects, an anti-aliasing filter can be used, the filter characteristics of which are to be adapted to the interference that occurs and to the useful signal.

The conversion of the analogue signal into a digital signal by means of the analogue-digital converter 12 results in a quantisation error, since only discrete values can be stored. Quantisation noise arises in the frequency range as a result, and this noise is superimposed onto the amplitude spectrum. Reducing the resolution increases the noise level so that the harmonics may no longer be clearly identifiable. In the present embodiment, the recorded measurement signal is therefore subsequently quantised. In practice, a resolution of 7 bits has proven to be sufficient to clearly distinguish the harmonics from the noise. As the resolution increases, the noise level decreases and the harmonics can be better identified.

The discrete-time, fast Fourier transformation (FFT/DFT) requires a finite number of measured values. Since the measurement signal is detected continuously, a time window is cut from the measurement signal. If the window width is not a multiple of the period duration of the signal, there is a jump point between the first and the last sample because the signal continues periodically. The jump results in further frequencies in the frequency spectrum which are not present in the signal. This effect is called the leakage effect (Meyer, Martin: Analog and digital signals, systems and filters, 8th Ed., Wiesbaden: Springer Vieweg 20179). In order to prevent this effect, in the present exemplary embodiment the signal is weighted by means of a window function. Due to the leakage effect, the frequencies occurring in the signal are not sharp current peaks in the amplitude spectrum, but a main lobe is created at the frequency, and this main lobe is surrounded by a plurality of side lobes. In the case of an oscillation having a high amplitude, the side lobe response can be higher than that of the main lobe of an adjacent oscillation and thus make it disappear in the noise. By varying the window function, the shape of the main lobe and that of the side lobes can be changed so that the largest possible number of relevant frequencies can be reliably detected.

When analysing the stator current $I_{stator}$, various window functions can be used which influence the frequency spectrum differently. For this reason, a window function should be selected whose properties are adapted to the desired spectrum. Compared to the rectangular window, the Hanning window has a wider main lobe, but the side lobes are significantly more attenuated. Since the amplitude of the side lobes is dependent on the amplitude of the main lobe, amplitudes around the network frequency are of particular interest in the stator current analysis. It has been shown that the Hanning window has the greatest separation between the marked harmonics and the noise. Therefore, the Hanning window is used in the present exemplary embodiment. However, other window functions may also be used.

In a first embodiment of the invention, the apparatus 13 for monitoring the stator current of the asynchronous motor is configured such that the rotor frequency $f_r$ (speed) is determined from the amplitude spectrum determined from the measurement signal using the fast Fourier transformation. The rotor frequency $f_r$ is automatically determined from the amplitude spectrum using an algorithm implemented in the apparatus for monitoring the stator current, which algorithm is based on the distribution of individual harmonics, which are attributable to the unbalanced mass, over the frequency of the spectral components in the amplitude spectrum (FIG. 3) and over the network frequency $f_n$ of the stator current $I_{stator}$.

The values of the amplitude spectrum can be present in an array. Since the amplitude spectrum of a purely real signal in the time domain, such as the current signal used here, is the same for positive and negative frequencies, only half of the spectrum is evaluated. Since not all local maxima in the amplitude spectrum are harmonics, and are instead created by noise, the only values examined are those which exceed a predefined threshold value. If the threshold value is too high, the harmonics, which contain information about the rotor frequency $f_r$, are not examined. If the threshold is too low, noise is interpreted as a harmonic. Since the amplitude of the harmonics varies with different loads and speeds, an absolute value is not specified as the threshold value, and the threshold value is instead determined relatively by number of highest values being specified. In order to determine the highest amplitudes, the amplitude spectrum is sorted in descending order by means of a suitable algorithm, for example a bubble sort algorithm. Since not all values have to be sorted, the bubble sort algorithm is terminated after reaching a predefined number. The frequency that has the highest amplitude is assumed to be the network frequency fn. The smallest amplitude of the sorted values is defined as the threshold value. Then the values above the threshold value are again sorted in ascending order according to their frequency.

Since the highest observed frequency of a harmonic occurs at an order of v=1 and m=10, all amplitudes above the frequency $$f_{ignore} \geq f_n \cdot [1 + 10 \cdot (1 - s_{min})] \quad \text{(Equation 5)}$$

are ignored. Here, $s_{min}$ is the minimum slip that occurs in the concrete compaction apparatuses. This can prevent network harmonics from being interpreted as suitable harmonics, since, in the case of a slip of zero, network harmonics and harmonics that arise due to the eccentricity are at the same frequency.

Starting with the highest frequency, a check is then done to see whether the present amplitude is a suitable harmonic. This is the case when the amplitudes of a plurality of harmonics exceed the threshold value at the calculated rotor frequency $f_r$. Since not all harmonics are always present, only two of the four harmonics have to match. However, a subsequent change in the number of matches is possible at any time.

In the present exemplary embodiment, the harmonics marked with X in FIG. 3 are examined at v=1, m=9 and v=1, m=10. For this purpose, the currently examined frequency is defined as $f_{m=10}$ and $f_{m=9}$ is then calculated according to the following equation:

$$f_{m=9} = f_r \cdot 9 + f_{nt} = \frac{9 \cdot f_{m=10} + f_{n\_est}}{10} \quad \text{Equation (6)}$$

The rotor frequency $f_{r\_est}$ is then calculated according to the following equation:

$$f_r = \frac{(f_{m=in} - f_{m,out})}{10} \quad \text{Equation (7)}$$

Since only discrete frequency values are present in the amplitude spectrum, linear interpolation can be used to obtain the amplitude of $f_{m=9}$ in the original spectrum. It has been found that it is possible to detect the rotor frequency with sufficient reliability based on just two harmonics in the amplitude spectrum. If further harmonics are included in the algorithm, the reliability of the determination of the rotor frequency $f_r$ (speed) can be increased even further.

The apparatus for monitoring the stator current $I_{stator}$ determines the rotor frequency $f_r$ (speed) of the asynchronous motor for each concrete compacting device of the plurality of concrete compacting devices which are used in the slipform paver. The speed of the asynchronous motors of all concrete compacting devices can be determined simultaneously or successively. For the simultaneous determination of the speed, all measurement signals are analysed simultaneously based on the method steps described above, which requires higher computing power.

After determining the rotor frequencies (speed) of the asynchronous motors of the individual concrete compacting devices, the speed of each asynchronous motor is compared with a limit value predefined for the motor. Since the same concrete vibrators are generally used, it is sufficient to specify a single limit value.

The apparatus 13 for monitoring the stator current $I_{stator}$ is configured such that a control signal is generated for each concrete compacting device if the rotor frequency (speed) of the asynchronous motor thereof falls below the limit value. A control signal can also be generated, however, when the limit value is exceeded.

The monitoring device 8 also has a signal unit 8A that receives the control signals from the apparatus 13 for monitoring the stator current and is designed such that improper compaction of the concrete during operation of the slipform paver is indicated by means of an acoustic and/or optical and/or tactile signal when the signal unit receives the relevant control signal, or that proper compaction of the concrete during operation of the slipform paver is indicated by means of an acoustic and/or optical and/or tactile signal when the signal unit does not receive the control signal.

The signal unit 8A can be provided on the control panel 9 of the slipform paver 1 (FIG. 1). Said control panel can have a plurality of signal lamps 14, wherein each concrete compacting device may be assigned a signal lamp that can be associated with improper compaction of the concrete, for example a red signal lamp, and/or a signal lamp that can signify proper compaction of the concrete, for example a green signal lamp. However, the operating states may also be displayed using graphic symbols, for example on a display. It is also possible for only one signal lamp or graphic symbol to be provided for signalling improper or proper operation for all concrete compacting devices, the rotor frequencies and the exceeding of or failure to meet the limit value being statistically evaluated. For example, an improper compaction of the concrete may only be determined if the predefined limit value is not reached for a certain number of concrete compacting devices and/or for a certain period of time.

The monitoring device 8 can also have a display unit for displaying the determined speed of the asynchronous motors of the concrete compacting devices.

An alternative embodiment of the monitoring device 8 is described below, which differs from the first embodiment in that, in order to determine that the concrete is properly or improperly compacted, it is not the rotor frequency fr (speed) of the asynchronous motor which is determined, but rather the distribution of individual harmonics X, which are attributable to the unbalanced mass, over the frequency of the spectral components is continuously determined and compared with a distribution of individual harmonics over the frequency of the spectral components, which distribution is characteristic of a predefined speed of the asynchronous motor. In this embodiment, spectral distribution patterns which are characteristic for the individual concrete compacting apparatuses and which can be empirically determined are stored in a memory 13A of the apparatus 13 for monitoring the stator current $I_{stator}$. Since the same concrete vibrators are used in practice, only one characteristic pattern is required. However, it is also possible to store characteristic patterns for different types of concrete vibrators in the memory 13A, the relevant pattern then being selected by the operating personnel for the type used.

The apparatus 13 for monitoring the stator current is configured such that a control signal is generated that signals a change in the compaction of the concrete introduced into the slipform of the slipform paver if the distribution of individual harmonics X, which are attributable to the unbalanced mass, over the frequency of the spectral components deviates from a distribution of individual harmonics which is characteristic for a predefined speed of the asynchronous motor, taking certain criteria into account. The deviation can be determined using suitable algorithms which are known to the person skilled in the art. For example, the frequencies of, e.g., two harmonics X attributable to the unbalanced mass can be determined using the arithmetic operations described above and can be compared with frequencies that are characteristic of a predefined speed of the asynchronous motor in an empirically determined pattern. If the frequencies of the harmonics are not within predefined frequency ranges, it is determined that the concrete has not been compacted properly, and the control signal is generated. The reliability can be further increased by identifying and analysing more than two harmonics in the amplitude spectrum. The comparison of the patterns can take place using the known algorithms.

What is claimed is:

1. A method for monitoring, during operation of a slipform paver, the compaction of concrete introduced into a slipform of the slipform paver via at least one concrete compacting device which has an asynchronous motor for driving an unbalanced mass which generates vibrations, the method comprising:
   monitoring a stator current of the asynchronous motor of the at least one concrete compacting device; and
   determining a change in the compaction of the concrete introduced into the slipform of the slipform paver based on an analysis of the stator current; and generating a control signal signaling the change in the compaction of the concrete introduced into the slipform of the slipform paver.

2. The method of claim 1, wherein an amplitude spectrum of the stator current is determined in order to analyse the stator current.

3. The method of claim 1, wherein the amplitude spectrum of the stator current is determined by a discrete-time Fourier transformation (DFT) of the stator current.

4. The method of claim 1, wherein:
a distribution of individual harmonics, which are attributable to the unbalanced mass, over the frequency of the spectral components is continuously determined and is compared with a distribution of individual harmonics over the frequency of the spectral components, which distribution is characteristic of a predefined speed of the asynchronous motor, and
the control signal is generated when a deviation occurs in the distribution of the individual harmonics.

5. The method of claim 1, wherein:
a distribution of individual harmonics, which are attributable to the unbalanced mass, over the frequency of the spectral components is continuously determined,
a speed of the asynchronous motor is continuously determined based on the distribution of individual harmonics over the frequency of the spectral components and over the frequency of the stator current, and
the control signal is generated when a deviation in the speed occurs.

6. The method of claim 5, wherein a threshold value for amplitudes of the harmonics is predefined for the analysis of the stator current of the asynchronous motor, and the distribution of individual harmonics over the frequency of the spectral components that are above the threshold value is determined.

7. The method of claim 5, wherein the continuously determined speed of the asynchronous motor is compared with a predefined limit value, the control signal being generated when the limit value is not reached.

8. The method of claim 1, further comprising:
generating a first output signal indicating improper compaction of the concrete during operation of the slipform paver when the control signal is generated, and
generating a second output signal indicating proper compaction of the concrete during operation of the slipform paver when the control signal is not generated.

9. A monitoring device for monitoring the compaction of concrete introduced into a slipform of a slipform paver via at least one concrete compacting device which has an asynchronous motor for driving an unbalanced mass which generates vibrations, the monitoring device comprising:
a current sensor configured to generate an output representing a stator current of the asynchronous motor of the at least one concrete compacting device; and
a data processor configured
to determine a change in the compaction of the concrete introduced into the slipform of the slipform paver based on an analysis of the stator current of the asynchronous motor, and
to generate a control signal signaling a change in the compaction of the concrete introduced into the slipform of the slipform paver.

10. The slipform paver of claim 9, wherein an amplitude spectrum of the stator current is determined in order to analyse the stator current.

11. The monitoring device of claim 9, wherein an amplitude spectrum of the stator current is determined in order to analyse the stator current.

12. The slipform paver of claim 11, wherein the stator current is sampled, and the amplitude spectrum of the stator current is determined by a discrete-time Fourier transform (DFT) of the stator current.

13. The monitoring device of claim 11, wherein the stator current is sampled, and the amplitude spectrum of the stator current is determined by a discrete-time Fourier transform (DFT) of the stator current.

14. The monitoring device of claim 9, wherein:
a first distribution of individual harmonics over a frequency of the spectral components is continuously determined, said first distribution being attributable to the unbalanced mass, and is compared with a second distribution of individual harmonics over the frequency of the spectral components, said second distribution being characteristic of a predefined speed of the asynchronous motor, and
the control signal is generated when a deviation occurs, which control signal signals a change in the compaction of the concrete introduced into the slipform of the slipform paver.

15. The monitoring device of claim 9, wherein:
a distribution of individual harmonics, which are attributable to the unbalanced mass, over the frequency of the spectral components is continuously determined,
a speed of the asynchronous motor is continuously determined based on the distribution of individual harmonics over the frequency of the spectral components and over a network frequency of the stator current, and
the control signal is generated when a deviation in the speed occurs, which control signal signals a change in the compaction of the concrete introduced into the slipform of the slipform paver.

16. The monitoring device of claim 15, wherein the continuously determined speed of the asynchronous motor is compared with a predefined limit value, the control signal being generated when the limit value is not reached.

17. The monitoring device of claim 15, wherein a threshold value for the amplitudes of the harmonics is predefined for the analysis of the stator current of the asynchronous motor, the distribution of individual harmonics over the frequency of the spectral components that are above the threshold value being determined.

18. The monitoring device of claim 9, further comprising a signal unit configured to generate a first output signal indicating improper compaction of the concrete during operation of the slipform paver when the signal unit receives the control signal, and to generate a second output signal indicating proper compaction of the concrete during operation of the slipform paver when the signal unit does not receive the control signal.

19. The monitoring device of claim 9, wherein the current sensor comprises a current transformer having a primary side coupled to receive the stator current and a secondary side coupled to a resistor, wherein a voltage across said resistor is representative of the stator current.

20. A slipform paver comprising:
a slipform;
at least one concrete compacting device which has an asynchronous motor for driving an unbalanced mass which generates vibrations;
a current sensor configured to generate an output representing a stator current of the asynchronous motor of the at least one concrete compacting device; and a data processor configured to determine a change in the compaction of the concrete introduced into the slipform of the slipform paver based on an analysis of the stator current of the asynchronous motor.

\* \* \* \* \*